Figure 1:
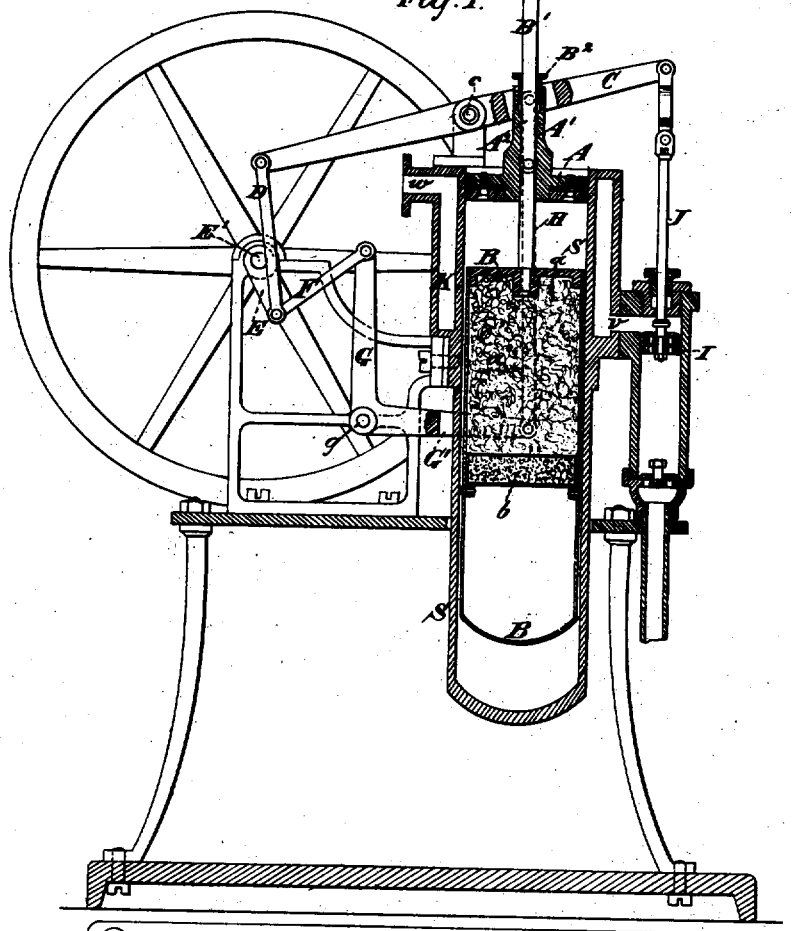

2 Sheets—Sheet 1.

J. ERICSSON,

Assignor to C. H. DELAMATER and G. H. ROBINSON.

Air Engine.

No. 9,414. Reissued Oct. 12, 1880.

Witnesses
John Becker
Jas. Hayne

Inventor
John Ericsson
by his Attorneys
Brown & Brown

THE NORRIS PETERS CO., WASHINGTON, D. C.

2 Sheets—Sheet 2.

J. ERICSSON,

Assignor to C. H. DELAMATER and G. H. ROBINSON.

Air Engine.

No. 9,414. Reissued Oct. 12, 1880.

Witnesses
John Becker
Fred Haynes

John Ericsson Inventor
by his Attorneys
Brown & Brown

THE NORRIS PETERS CO., WASHINGTON, D. C.

UNITED STATES PATENT OFFICE.

JOHN ERICSSON, OF NEW YORK, N. Y., ASSIGNOR TO CORNELIUS H. DELAMATER AND GEORGE H. ROBINSON, OF SAME PLACE.

AIR-ENGINE.

SPECIFICATION forming part of Reissued Letters Patent No. 9,414, dated October 12, 1880.

Original No. 226,052, dated March 30, 1880. Application for reissue filed September 3, 1880.

*To all whom it may concern:*

Be it known that I, JOHN ERICSSON, of the city, county, and State of New York, have invented certain new and useful Improvements in Air-Engines, of which the following is a specification, reference being had to the accompanying drawings.

This invention relates to that class of air-engines in which, by the action of a piston, which may be termed the "exchange-piston," working in a cylinder, at or near one end of which is the working-piston and at the other end of which is the fire-place, the same air is over and over again transferred from each end of the said cylinder to the other, alternately, being heated and expanded during its transference in one direction, and being cooled and contracted during its transference in the other direction, the said piston also performing the office of a regenerator.

One part of my invention consists in a novel system of mechanism for transmitting motion from the working-piston to a crank and to the exchange-piston, whereby, with a short stroke of the working-piston, I obtain both a long crank and a long movement of the exchange-piston, and the movements of the two pistons relatively to each other are so timed as to obtain the most effective action.

Another part of my invention consists in a novel arrangement of a pump and its connections with an air-engine, whereby I obtain a very effective pumping-engine with a short stroke of the engine-piston and a very long proportionate stroke of the pump plunger or piston.

Another feature of my invention relates only to air-engines for pumping water, and has for its object the effective and economical cooling of that part of the air-cylinder in which the air is required to be cooled. In order to obtain this result I surround that part of the cylinder with a water-jacket; and this part of my invention consists in so combining such jacket with the water-pump, of such an engine that the water delivered by such pump is caused to circulate by a forced pressure through the said jacket. The water thus circulating round the cylinder cools it very effectively, and without imposing any appreciable additional work upon the engine beyond that of its regular duty of pumping.

Figure 2:
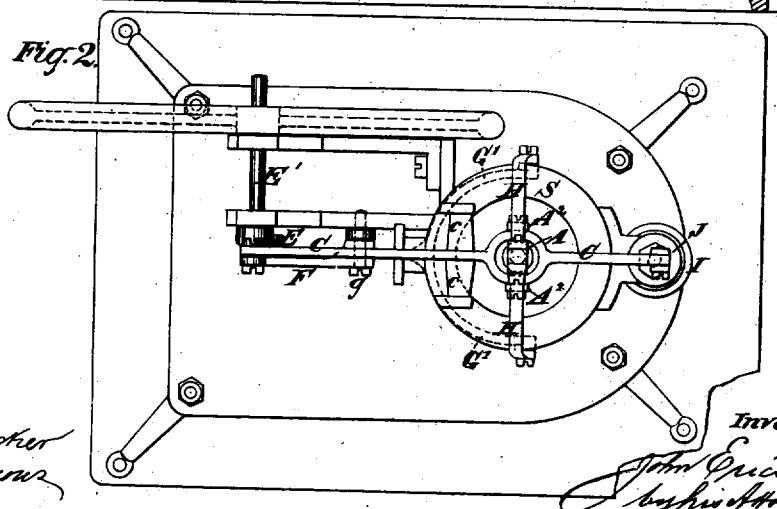
Figure 3:
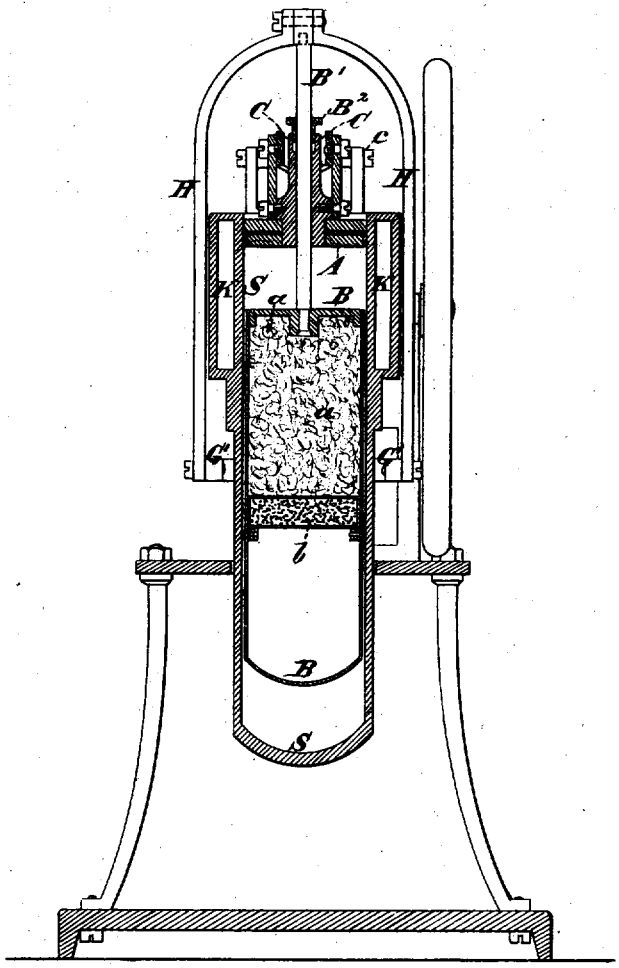

In the accompanying drawings, Figure 1 is a vertical section of an upright engine constructed according to my invention, especially adapted for pumping, but also capable of use for other purposes. Fig. 2 is a plan of the same, and Fig. 3 a transverse vertical section.

S is the cylinder of the engine, open at the upper end, and containing two pistons—viz., the working-piston A and the exchange-piston B. The lower part of the said cylinder is closed and intended to be heated by gas, coal, or other fuel, with a burner or fire-place of any suitable construction. The working-piston A, which is in the upper part of this cylinder, is packed in any suitable manner to work air-tight therein.

The exchange-piston B, which is of considerable length in an axial direction, is so much smaller than the cylinder that an annular space for free passage of air is left between its exterior and the interior of the cylinder. The said piston is represented as hollow and having its upper part, which is farthest from the fire or heat, partly filled with cotton or other fibrous material, *a a*, below which, inclosed, is a stratum, *b*, of powdered charcoal or other such non-conducting material as will protect the fibrous material from taking fire by the heat to which the bottom part of the piston is subjected.

The working-piston A is connected by a hollow rod or trunk, A′, and short side links, $A^2$, with a beam, C, above the cylinder, the connection being at a short distance from the fixed center of oscillation, *c*, of the beam. This beam is connected at a much greater distance from the other side of the said center *c*, by a connecting-rod, D, with the crank E on the main shaft E′ of the engine, which is arranged on one side of the cylinder. This crank is also connected by a rod, F, with one arm, G, of a bell-crank lever, G G′, which has a fixed center of oscillation at *g*, and the other forked arm, G′, is connected by arched side rods, H, on opposite sides of the cylinder, by an arched yoke, with the head *g*.

The piston-rod B′ of the exchange-piston B passes through the hollow rod or trunk A′ of the working-piston, and is packed air-tight by a stuffing-box, $B^2$, in the top of said hollow rod or trunk. The center of oscillation of the bell-crank is arranged on the same side of the cylinder as the crank-shaft, but nearer to the side of the cylinder and farther from the upper part, in which the working-piston works.

By means of this system of connections the beam, receiving motion from the working-piston, is caused to transmit motion through the rod D to the crank E, which is caused to transmit motion, through the rod F, the bell-crank lever G G′, and the rods or yoke H, to the exchange-piston.

The movements of the pistons are as follows: During the upward movement of the exchange-piston the cool air from the upper part of the cylinder will be transferred by the said piston through the annular space between it and the cylinder to the bottom and lower part of the latter, which is heated, as hereinabove described. The air so transferred, becoming heated, expands in the lower part of the cylinder, and its expansion causes it to force the working-piston upward. This movement of the exchange-piston is about three-fourths completed before the working-piston commences its upward movement, by which its work is done, and when the working-piston has nearly completed the upward or working stroke the exchange-piston begins to descend and force the hot air back from the lower heated to the upper cool part of the cylinder, completing its stroke by the time the working-piston has made about one-third of its return-stroke.

It will be understood that with such a movement of the piston as above described the working-piston is actuated by the air which is confined in the cylinder, and which is caused to be heated and cooled alternately by the peculiar motion of the exchange-piston, which transfers it from the heated to the cool and from the cool to the heated part of the cylinder.

It will be evident that the large surface presented by the outside of the long exchange-piston and inside of the long cylinder will cause a rapid change of temperature of the latter, the exchange-piston thus performing the office of what has been termed in air-engines a "regenerator."

By the arrangement of the crank-shaft, the centers of motion of the beam and bell-crank lever, and of the connections, I obtain a long crank with a short stroke of the working-piston, and obtain a long stroke of the exchange-piston with such long side rods or yoke for working the latter piston and such slight deviation from a right line in the movement of the said side rods or yoke that guides for the said rods or yoke are unnecessary.

I is a pump arranged on the opposite side of the cylinder S to the crank-shaft. The piston or plunger rod J of this pump is connected with the beam C on the same side of the center of oscillation of the latter as the engine-piston connections, the beam being prolonged beyond the cylinder S for the purpose of making this connection, and so obtaining the well-understood advantage of a long stroke for the pump with a short stroke of the working-piston of the engine. This pump is represented as delivering its water through a jacket, K, which surrounds the upper part of the engine-cylinder, the water from the discharge-port of the pump entering the said jacket near the bottom at *v*, Fig. 1, and passing out from said jacket at *w*, near the top thereof, on the side opposite to *v*. The water circulates in the jacket around the upper part of the cylinder, for the purpose of cooling it, and so causing the air, on its being transferred to that part of the cylinder, to be cooled not only more rapidly, but to a lower temperature than would be practicable without the water-jacket.

As the power of the engine depends on the difference between the repective temperatures of the lower and upper parts of the air-cylinder, it is obvious that its power must be increased by the cooling effect of the circulation through the water-jacket of all the water pumped by the engine. As this cooling of the cylinder is effected in an engine for pumping purposes without imposing any work on the engine beyond that of its ordinary duty of pumping water and the very slight friction of the water in the jacket which, is scarcely appreciable, the economy of this combination of the water-jacket and pump with the cylinder is obvious.

The water jacket is not, however, absolutely necessary to the successful operation of the engine, for the cylinder, when made very long, as in the example represented, presents a large exterior radiating-surface, which may be further increased by corrugating its upper part.

I do not here intend to claim, broadly, a water-jacket surrounding the cylinder of an air-engine; but

What I claim as my invention is—

1. The combination, with the cylinder, crank-shaft, and crank of an air-engine, of a working-piston and an exchange-piston in the said cylinder, a beam and connecting-rod connecting the working-piston with the crank, and a bell-crank lever and connections connecting the crank with the exchange-piston, substantially as herein described.

2. The combination of the working-pistons A B, beam C, connecting-rod D, crank E, connecting-rod F, bell-crank lever G, and rods or yoke H, all substantially as herein described.

3. The combination, with the working cylinder and piston of an air-engine and a beam with which the said piston is connected, of a pump having its piston or plunger connected with the said beam at a greater distance from the center of oscillation thereof than the connection of the working-piston, substantially as and for the purpose herein described.

4. The combination, with the air-cylinder and the water-pump of an air-engine for pumping water, of a water-jacket surrounding the said cylinder, and so connected with the said pump that the water delivered from the said pump, causing a forced circulation, passes through the said jacket, substantially as herein described, for the purpose set forth.

J. ERICSSON.

Witnesses:
S. W. TAYLOR,
FREDK. HAYNES.